(12) United States Patent
Baker et al.

(10) Patent No.: US 10,582,292 B2
(45) Date of Patent: Mar. 3, 2020

(54) PRINTED CIRCUIT BOARD (PCB) MOUNT FOR HEADPHONE EARCUP

(71) Applicant: Bose Corporation, Framingham, MA (US)

(72) Inventors: Daniel P. Baker, Warwick, RI (US); Christopher A Barnes, Lynnfield, MA (US)

(73) Assignee: BOSE CORPORATION, Framingham, MA (US)

( * ) Notice: Subject to any disclaimer, the term of this patent is extended or adjusted under 35 U.S.C. 154(b) by 70 days.

(21) Appl. No.: 15/726,764

(22) Filed: Oct. 6, 2017

(65) Prior Publication Data

US 2019/0110123 A1    Apr. 11, 2019

(51) Int. Cl.
*H04R 1/10* (2006.01)
*H04R 5/033* (2006.01)
*G06F 3/044* (2006.01)

(52) U.S. Cl.
CPC .......... *H04R 1/1075* (2013.01); *G06F 3/044* (2013.01); *H04R 1/1008* (2013.01); *H04R 1/1041* (2013.01); *H04R 1/1066* (2013.01); *H04R 5/033* (2013.01)

(58) Field of Classification Search
CPC .. H04R 1/1008; H04R 1/1041; H04R 1/1066; H04R 5/033; H04R 1/1075; G06F 3/044
See application file for complete search history.

(56) References Cited

U.S. PATENT DOCUMENTS

| | | | |
|---|---|---|---|
| 6,142,435 A | 11/2000 | Lodi | |
| 9,036,855 B2* | 5/2015 | Shah | H04R 1/1041 381/371 |
| 2010/0020511 A1 | 1/2010 | Braman et al. | |
| 2011/0182458 A1* | 7/2011 | Rosener | H04R 1/1041 381/384 |
| 2012/0064845 A1* | 3/2012 | Smith | H04M 1/05 455/90.2 |
| 2014/0334657 A1* | 11/2014 | Guenther | H04R 5/0335 381/370 |
| 2016/0073200 A1* | 3/2016 | Yoo | H04R 5/0335 381/311 |
| 2016/0150311 A1* | 5/2016 | Bremyer | H04R 1/1008 381/371 |
| 2017/0230744 A1 | 8/2017 | Schrader et al. | |
| 2017/0257693 A1 | 9/2017 | Breen et al. | |

OTHER PUBLICATIONS

Invitation to Pay Additional Fees and Partial International Search Report for International Patent Application No. PCT/US2018/054082 dated Jan. 8, 2019, 17 pages.
International Search Report and Written Opinion for International Patent Application No. PCT/US2018/054082 dated Mar. 4, 2019, 21 pages.

* cited by examiner

Primary Examiner — Tuan D Nguyen
(74) Attorney, Agent, or Firm — Hoffman Warnick LLC (57) ABSTRACT

Various implementations include printed circuit board mounts and related headphone systems employing such mounts. In one implementation, a mount for a printed circuit board (PCB) includes: a plate for matingly engaging an inner portion of a headphone earcup, the plate including at least one PCB mount for coupling with the PCB; and a coupling element extending from the plate and including at least one coupler for coupling the plate proximate to a spine extending through the inner portion of the headphone earcup.

20 Claims, 9 Drawing Sheets

PRINTED CIRCUIT BOARD (PCB) MOUNT FOR HEADPHONE EARCUP

TECHNICAL FIELD

This disclosure generally relates to headphones. More particularly, the disclosure relates to a printed circuit board (PCB) mount for a headphone system having a capacitive touch interface.

BACKGROUND

Capacitive touch interfaces allow for dynamic control of a variety of electronic devices. However, spacing constraints can make it difficult to utilize capacitive touch interfaces in particular applications. Additionally, devices with dynamic components make utilizing capacitive touch interfaces even more difficult.

SUMMARY

All examples and features mentioned below can be combined in any technically possible way.

Various implementations include a printed circuit board mount for a headphone system. In some implementations, these headphone systems have a continuous headband spring with a capacitive touch interface.

In some particular aspects, a mount for a printed circuit board (PCB) includes: a plate for matingly engaging an inner portion of a headphone earcup, the plate including at least one PCB mount for coupling with the PCB; and a coupling element extending from the plate and including at least one coupler for coupling the plate proximate to a spine extending through the inner portion of the headphone earcup.

In other particular aspects, a headphone system includes: an earcup having: an outer portion including a capacitive touch interface; and an inner portion opposing the outer portion and including a capacitive touch surface corresponding with the capacitive touch interface; a mount coupled to the earcup, the mount having: a plate contacting at least a portion of the capacitive touch surface, the plate including at least one printed circuit board (PCB) mount; and a coupling element extending from the plate and including at least one coupler engaging the inner portion of the earcup; and a PCB coupled with the at least one PCB mount and electrically connected with the capacitive touch surface.

Implementations may include one of the following features, or any combination thereof.

In some cases, the coupling element includes an arcuate coupler forming an arc sized to matingly engage the spine.

In certain implementations, the at least one PCB mount is positioned to extend away from the inner portion of the headphone earcup.

In particular cases, the plate further includes: a first surface from which the at least one PCB mount extends; and a second surface opposing the first surface, the second surface having a substantially planar interface for contacting a capacitive touch surface on the inner portion of the headphone earcup, the capacitive touch surface being electrically connected with the PCB, the at least one PCB mount sized to separate the PCB from the capacitive touch surface. In some implementations, the plate further includes a retention feature extending from the first surface of the plate for engaging a mating feature on the inner portion of the headphone earcup. In certain cases, the at least one PCB mount includes a plurality of PCB mounts extending from the first surface of the plate.

In particular implementations, the plate further includes at least one of: a cable management feature sized to engage at least one cable extending from the PCB, at least one alignment pin for aligning the PCB relative to the plate, or a cable guide having an overhang for preventing contact between at least one cable and the PCB.

In some cases, the coupling element includes a cable slot sized to accommodate at least one cable extending into the spine of the headphone earcup.

In certain implementations, the at least one coupler includes a plurality of coupler openings for aligning with corresponding openings on the inner portion of the headphone earcup.

In some cases, the inner portion of the earcup has a spine extending therethrough, and the coupling element is sized to matingly engage the spine. In particular cases, the spine has an arcuate surface along the inner portion of the earcup, and the coupling element has an arcuate coupler sized to matingly engage the spine. In certain implementations, the coupling element includes a cable slot sized to accommodate at least one cable extending into the spine of the earcup. In some cases, the headphone system includes a continuous headband spring at least partially received by the spine of the earcup.

In particular implementations, the at least one PCB mount extends away from the capacitive touch interface to physically separate the PCB from the capacitive touch surface.

In certain cases, the plate includes: a first surface from which the at least one PCB mount extends; and a second surface opposing the first surface, the second surface having a substantially planar interface contacting the capacitive touch surface. In some implementations, the plate further includes a retention feature extending from the first surface of the plate.

In particular cases, the at least one PCB mount includes at least one boss, and the headphone system further includes a boss coupler joining the PCB and the PCB mount.

In certain implementations, the plate further includes at least one of: a cable management feature sized to engage at least one cable extending from the PCB, at least one alignment pin for aligning the PCB relative to the plate, or a cable guide having an overhang for preventing contact between at least one cable and the PCB.

In particular cases, the headphone system further includes: an additional earcup; and a headband connecting the earcup and the additional earcup.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a printed circuit board (PCB) mount can be beneficially incorporated into a headphone system with a capacitive touch interface. For example, a PCB mount can be configured to support a PCB in a headphone system to facilitate use of a capacitive touch interface.

Commonly labeled components in the FIGURES are considered to be substantially equivalent components for the purposes of illustration, and redundant discussion of those components is omitted for clarity.

A headphone refers to a device that fits around, on, or in an ear and that radiates acoustic energy into the ear canal. Headphones are sometimes referred to as earphones, earpieces, headsets, earbuds or sport headphones, and can be wired or wireless. A headphone includes an acoustic driver to transduce audio signals to acoustic energy. The acoustic driver may be housed in an earcup. While some of the figures and descriptions following show a single headphone, a headphone may be a single stand-alone unit or one of a pair of headphones (each including a respective acoustic driver and earcup), one for each ear. A headphone may be connected mechanically to another headphone, for example by a headband and/or by leads that conduct audio signals to an acoustic driver in the headphone. A headphone may include components for wirelessly receiving audio signals. A headphone may include components of an active noise reduction (ANR) system. Headphones may also include other functionality such as a microphone so that they can function as a headset.

In an around or on-the-ear headphone, the headphone may include a headband and at least one earcup that is arranged to sit on or over an ear of the user. In order to accommodate heads of different sizes and shapes, the earcups are configured to pivot about the vertical and/or horizontal axes, and to translate for some distance along the vertical axis.

Headphones according to some implementations herein can include a continuous headband spring coupled with one or more earcups. The headband spring can provide the desired clamping pressure in the headphones in order to maintain contact between the earcup(s) and the user's head. In the dual-earcup configuration, the headband spring can provide a significant portion (e.g., nearly all) of the clamping pressure between the earcups. This continuous headband spring can be formed of a single piece of material (e.g., a metal or composite material) or can be formed of a plurality of separate pieces coupled together. The continuous headband spring can be coupled with a head cushion for interfacing with a user's head. In particular cases, the continuous headband spring connects a pair of earcups. This continuous headband spring configuration can allow for adjustment of the position of the earcups without modifying a position of the headband spring or the cushion. That is, the continuous headband spring configuration allows the user to adjust the position of the earcups relative to the headband spring, without altering the length of the headband spring (or the cushion). In particular implementations, the continuous headband spring can include an internal slot for accommodating an adjustment apparatus that adjusts each of the earcups.

As described herein, the printed circuit board (PCB) mount can enable use of a capacitive touch interface in a headphone system. In particular implementations, the PCB mount can couple a PCB inside an earcup to enable the capacitive touch interface.

Figure 1:
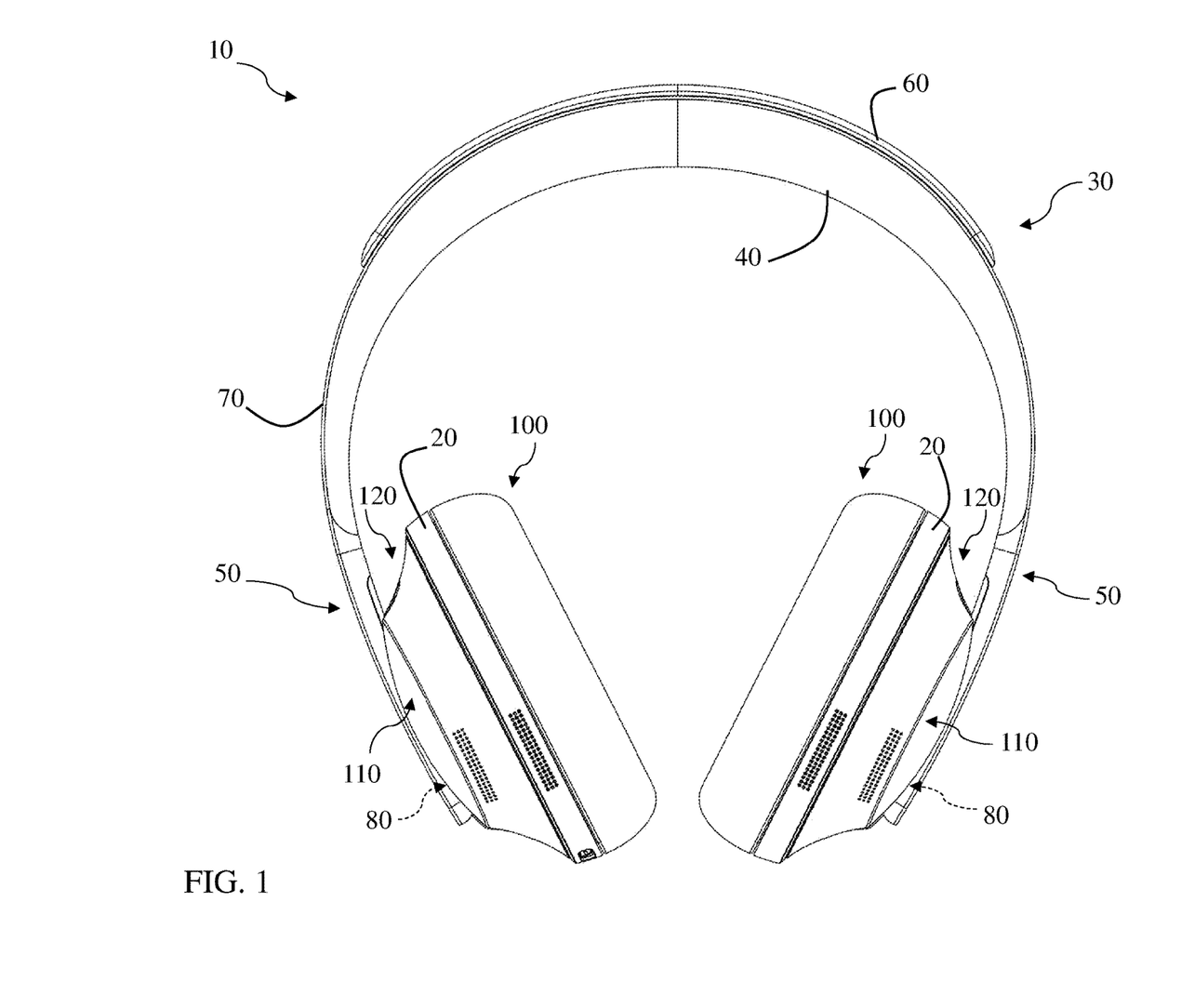
FIG. 1 shows a perspective view of a headphone system according to various implementations.

FIG. 1 shows a perspective view of a headphone system 10 according to various implementations. As shown, headphone system 10 can include a pair of earcups 20 configured to fit over the ear, or on the ear, of a user. A headband 30 spans between the pair of earcups 20 (individually labeled as earcups 20) and is configured to rest on the head of the user (e.g., spanning over the crown of the head or around the head). The headband 30 can include a head cushion 40, which is coupled with a continuous headband spring 50 (partially obstructed by head cushion 40 in this view). A headband cover 60 is also shown covering a portion of the outer surface 70 of the headband spring 50. In some cases, as described herein, the earcups 20 can each include a spine 80 at least partially receiving the continuous headband spring 50.

In some particular implementations, the continuous headband spring 50 connects the pair of earcups 20, and permits movement of the earcup(s) 20 without modifying a length of the continuous headband spring (also referred to as "headband spring") 50. That is, according to various implementations, earcups 20 are configured to move independently of the outer surface 70 of the headband spring 50, such that earcups 20 appear to slide, rotate or otherwise translate along the headband spring 50. In this sense, the spine 80 permits movement of the earcups 20 along the headband spring 50.

Figure 2:
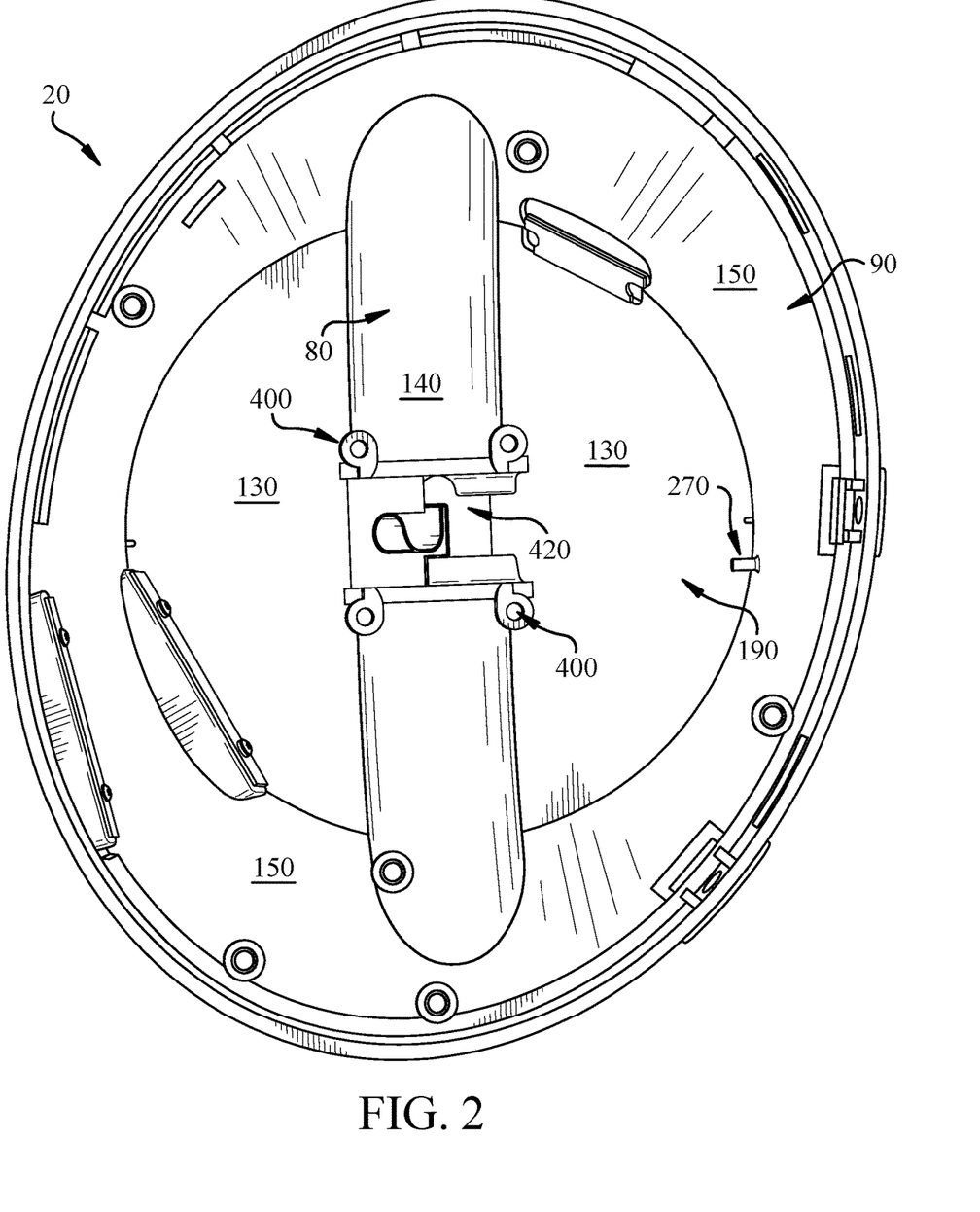
FIG. 2 shows a perspective view of an inner portion of an earcup according to various implementations.

FIG. 2 shows a perspective view of an inner portion 90 of the earcup 20. With continuing reference to FIG. 1, in this depiction, the earcup 20 is shown separated from its corresponding ear cushion 100. FIG. 1 also illustrates a capacitive touch interface 110 located on the outer portion 120 of the earcup(s) 20 (e.g., in one or both earcups 20) which can be used to control one or more functions of the headphone system 10. In various implementations, the capacitive touch interface 110 allows for touch-based control of one or more functions of the headphone system 10, such that the user can create a capacitive couple with the interface 110 (e.g., using a fingertip, hand, or other actuator) in order to initiate a command. In some implementations, the capacitive touch interface 110 can be formed of a material such as a conventional plastic and/or a painted material such as a painted plastic material, and may be configured for mutual-capacitance or self (or absolute) capacitance modes of operation.

The perspective of FIG. 2 shows the inner portion 90 of earcup 20 that is obstructed when the ear cushion 100 is in place. The inner portion 90 of earcup 20 can oppose the outer portion 120 in that it resides inside the casing defining the earcup 20. In various implementations, the inner portion 90 includes a capacitive touch surface 130 that corresponds with the capacitive touch interface 110 on the outer portion 120 of earcup 20. The capacitive touch surface 130 can be electrically coupled with the capacitive touch interface 110, e.g., via wiring or a conductive surface such as the outer wall of the earcup 20. In various implementations, capacitive touch surface 130 can be formed of a material similar to capacitive touch interface 110, e.g., a conventional plastic, and in some particular cases, a bare plastic (as molded).

Also shown in FIG. 2, the inner portion 90 of the earcup 20 includes an arcuate surface 140 (e.g., an arcuate convex surface, formed as a ridge or protrusion) corresponding with the spine 80 that extends at least partially through the earcup 20. In various implementations, the spine 80 is defined by an arcuate concave surface (e.g., a slot or recess) along the outer portion 120 of earcup 20, and the corresponding arcuate surface 140 along the inner portion 90 of the earcup 20. As described herein, the spine 80 can allow for movement of the earcup 20 relative to the headband spring 50, without needing to modify a length of that headband spring 50. FIG. 2 illustrates one implementation where capacitive touch surface 130 does not extend to the arcuate surface 140 corresponding with spine 80. That is, the capacitive touch surface 130 can correspond with at least a portion of the capacitive touch interface 110 to allow electrical coupling between the outer portion 120 and the inner portion 90. In some cases, the capacitive touch surface 130 covers only a section of the inner portion 90, and in particular implementations, may only cover a sub-section of the corresponding surface of the capacitive touch interface 110. FIG. 2 further illustrates a sidewall 150 of the earcup 20, which extends around the inner portion 90 and abuts the capacitive touch surface 130. In some cases, the arcuate surface 140 of the spine 80 extends between distinct sections of the sidewall 150.

Figure 3:
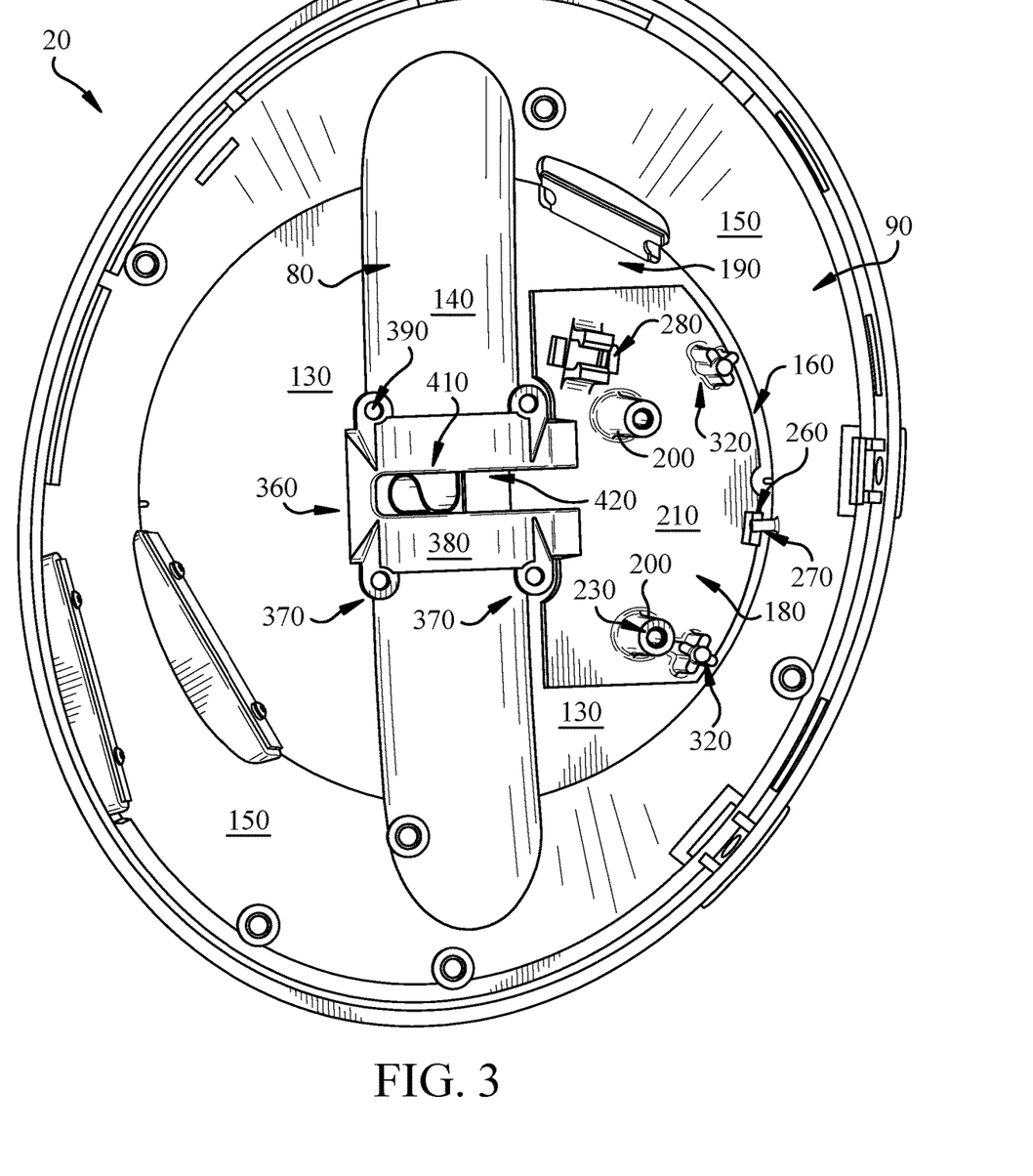
FIG. 3 shows a perspective view of the inner portion of an earcup along with a printed circuit board (PCB) mount according to various implementations.
Figure 4:
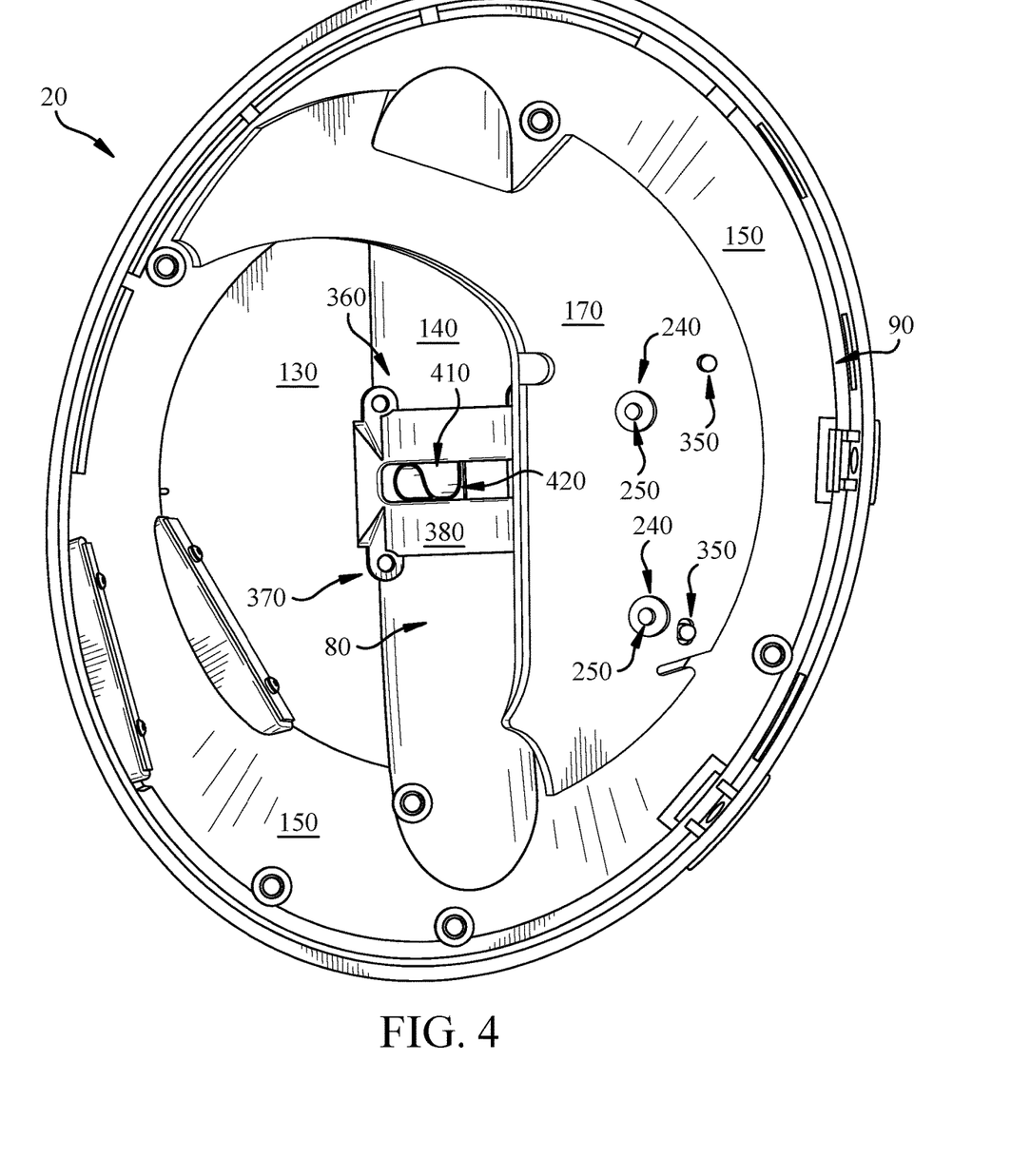
FIG. 4 shows a perspective view of the inner portion of the earcup of FIG. 3, further depicting a PCB, according to various implementations.

FIG. 3 illustrates a mount 160 for a printed circuit board (PCB) according to various implementations. FIG. 4 illustrates an example PCB 170 for controlling the capacitive touch interface 110 (via capacitive touch surface 130), which is mounted on the mount 160. FIGS. 3 and 4 are referred to simultaneously. Mount 160 is shown located on inner portion 90 of earcup 20, such that mount 160 is configured to mount the PCB 170 (FIG. 4) to the earcup 20 to perform functions described herein. In various particular implementations, mount 160 is configured separate the PCB 170 (FIG. 4) from the capacitive touch surface 130 in order to prevent electrical interference between the PCB 170 and the capacitive touch surface 130. In various implementations, mount 160 can be formed of a conventional plastic or other insulating material.

As shown in FIG. 3, in various implementations, the mount 160 can include a plate 180 for matingly engaging the inner portion 90 of the earcup 20. In particular cases, the plate 180 can be sized to fit within a section 190 of the inner portion 90 spanning between the arcuate surface 140 of the spine 80 and the sidewall 150. In some cases, the plate 180 can have a width in at least one direction that spans most of, or substantially all of, a width of the capacitive touch surface 130 spanning between the arcuate surface 140 and the sidewall 150. However, plate 180 can have any dimension(s) capable of facilitating the mounting functions of the mount 160 described herein.

Additionally, the plate 180 can include at least one PCB mount 200 (example of two shown) for coupling with the PCB 170 (FIG. 4). The PCB mount(s) 200 can be positioned to extend away from the inner portion 90 of the earcup 20, such that it extends toward the ear cushion 100 (FIG. 1). As illustrated in FIG. 3, but also illustrated in various perspective views of the mount 160 in FIGS. 5-7, the plate 180 can include a first surface 210 from which the PCB mount(s) 200 extends, and a second surface 220 (FIG. 7) opposing the first surface 210. The second surface 220 can have a substantially planar interface for contacting the capacitive touch surface 130 on the inner portion 90 of the earcup 20. That is, the second surface 220 can be planar or nearly entirely planar so as to coincide with the planar surface of the capacitive touch surface 130. As noted herein, the capacitive touch surface 130 is designed to electrically connect with the PCB 170, and in some cases, the second surface 220 is configured to avoid interfering with the capacitive touch surface 130 by resting against that surface in a coincidental manner.

According to particular implementations, each PCB mount 200 is sized to separate the PCB 170 from the capacitive touch surface 130. That is, as shown in the perspective views of FIGS. 5 and 6, each PCB mount 200 can extend at least approximately 0.5 to 0.7 millimeters (mm) from the first surface 210 in order to space the PCB 170 from the capacitive touch surface 130. In some particular implementations, each PCB mount 200 can have a thickness at least 2-4 times a thickness of the plate 180 (as measured in a common direction).

In some implementations, each PCB mount 200 can include a boss, pillar, hook, stand, screw, stake (e.g., for heat staking) or other protrusion capable of mating with one or more corresponding sections of the PCB 170. In some cases, each PCB mount 200 can extend from the plate 180 at least an equal distance as the peak of the arcuate surface 140 (e.g., measured from the capacitive touch surface 130). In some cases, this can allow the PCB 170 (FIG. 4) to sit over the PCB mount 200 and the arcuate surface 140. According to various implementations, each PCB mount 200 can include a mating feature 230 for mating with a corresponding mating feature 240 in the PCB 170 (FIG. 4). In some cases, the (PCB mount) mating feature 230 can include an aperture or slot sized to receive a coupler 250 (FIG. 4) (e.g., a pin, screw or bolt) for joining the PCB 170 with the PCB mount 200 at the respective mating features 230, 240. The mating feature 240 in the PCB 170 can have similar or corresponding characteristics (e.g., aperture size) as the (PCB mount) mating feature 230 to accommodate the coupler 250.

Figure 5:
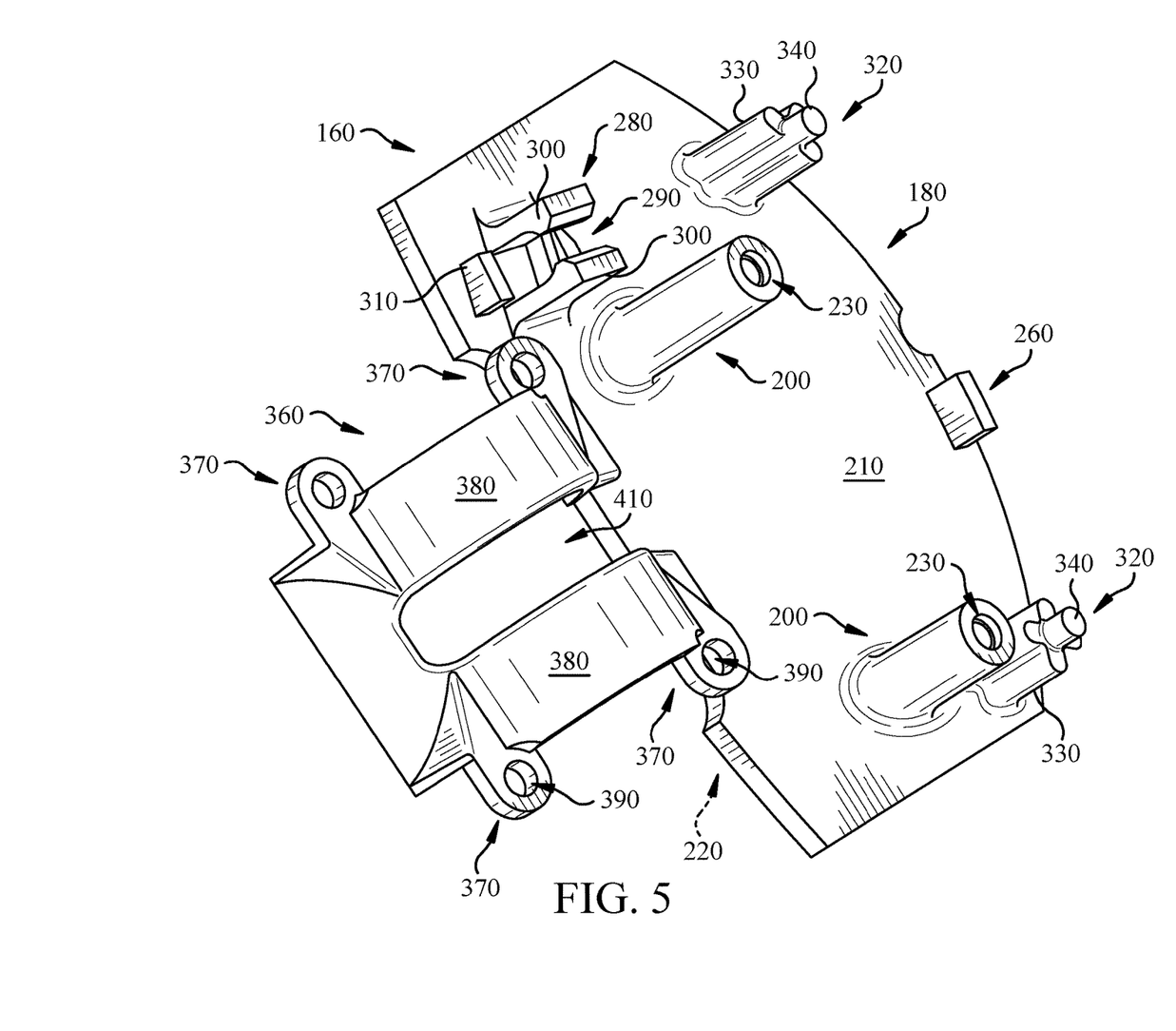
FIG. 5 shows a perspective view of a PCB mount according to various implementations.
Figure 6:
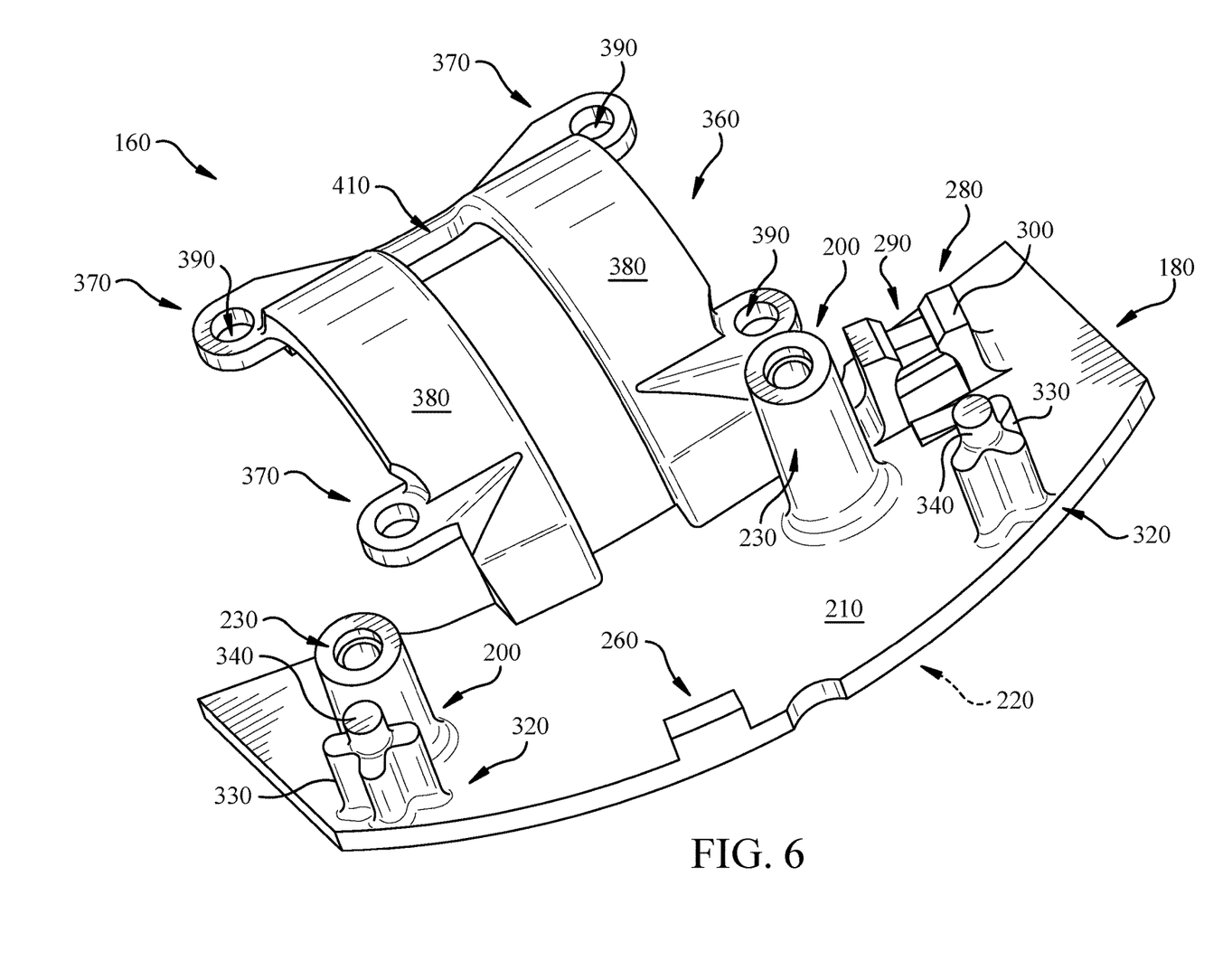
FIG. 6 shows an additional perspective view of the PCB mount of FIG. 5.
Figure 7:
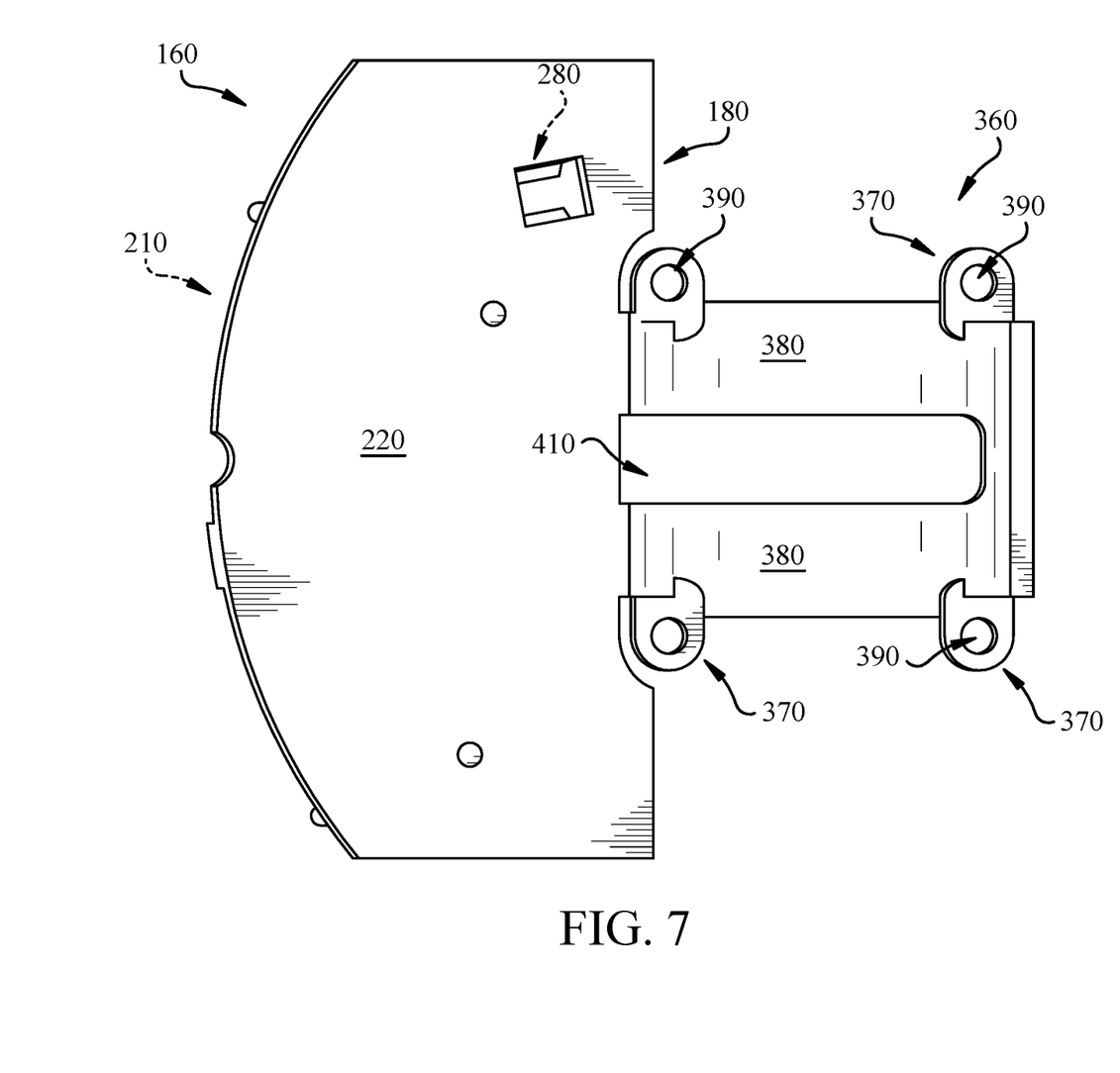
FIG. 7 shows another perspective view of the PCB mount of FIG. 5.

In various implementations, as shown most clearly in FIGS. 3, 5 and 6, the plate 180 can further include a retention feature 260 extending from the first surface 210 of the plate 180 for engaging a mating feature 270 on the inner portion 90 of the earcup 20 (FIG. 3). In some cases, the retention feature 260 includes a tab or protrusion extending from the first surface 210, e.g., in the same direction as the PCB mount 200, to engage the mating feature 270 on the inner portion 90 of the earcup 20. The mating feature 270 can include a tab, pin, overhang or other member extending over the capacitive touch surface 130 (e.g., extending from sidewall 150 or from an area proximate the capacitive touch surface 130) positioned to engage the retention feature 260. When engaged with the mating feature 270, the retention feature 260 is configured to aid in retaining the mount 160 adjacent the capacitive touch surface 130 (and between the capacitive touch surface 130 and the PCB 170). Mating feature 270 may contact retention feature 260 and restrict movement of the plate 180 relative to the capacitive touch surface 130.

In various implementations, as shown most clearly in FIGS. 3, 5 and 6, the plate 180 can further include a cable management feature 280 sized to engage at least one cable extending from the PCB 170 (FIG. 4). In some cases, the cable management feature 280 includes a slot 290 sized to receive the cable extending from the PCB 170. For example, cable management feature 280 can include a set of protrusions (or tabs) 300 extending from the first surface 210 to define the slot 290. In some cases, the protrusions 300 are spaced apart from one another at a distance approximately equal to an outer diameter (or a largest width) of a PCB cable. In some cases, the protrusions 300 have sufficient flexion to allow a cable to be inserted and removed from the slot 290. Additionally, in some implementations, the cable management feature 280 can include at least one stopper 310 to restrict movement of the cable within the slot 290.

Also illustrated in FIGS. 3, 5 and 6, in some cases, the plate 180 can further include at least one alignment pin 320 (example of two shown) for aligning the PCB 170 (FIG. 4) relative to the plate 180. In some cases, the alignment pin 320 includes at least one pin-shaped member extending from the first surface 210 (e.g., in the direction of the PCB 170). In particular implementations, the alignment pin 320 can include a pillar 330 with a pin member 340 extending from the pillar 330. In various implementations, the pin member 340 is sized to engage an aperture 350 (FIG. 4) in the PCB 170, and allow the PCB 170 to rest on the pillar 330. Any number of alignment pins 320 can be implemented to aid in aligning and/or supporting the PCB 170 (FIG. 4), and it is understood that alignment pin(s) 320 and PCB mounts 200 (e.g., one or more) can be used to support the PCB 170.

Returning to FIG. 3, and with reference to FIGS. 4-7, in some implementations, the mount 160 can further include a coupling element 360 extending from the plate 180, which includes at least one coupler 370 for coupling the plate 180 proximate the spine 80. In various implementations, the coupling element 360 is formed as a continuous (e.g., unitary) piece of material with the plate 180, such that the plate 180 and the coupling element 360 are formed of a substantially uniform material. However, in other cases, the coupling element 360 can be separately formed and later joined with the plate 180. In any case, the coupling element 360 can couple the plate 180 to the inner portion 90 of the earcup 20 proximate the spine 80. In particular cases, the coupling element 360 can include an arcuate coupler 380 forming an arc sized to matingly engage the spine 80 (e.g., to wrap around the curvature of the spine 80). In some cases, the coupling element 360 is sized to fit substantially flush with at least a portion of the arcuate surface 140 in order to couple the plate 180 to the inner portion 90 of the earcup 20. According to some implementations, the coupler(s) 370 include a plurality of coupler openings 390 (FIG. 5, FIG. 6) for aligning with corresponding openings 400 (FIG. 2) on the inner portion 90 of the earcup 20. In various implementations, the coupler openings 390 (and corresponding openings 400) can be sized to receive a coupler such as a screw, bolt, pin, etc. for joining the coupling element 360 to the inner portion 90 of the earcup 20 proximate the spine 80. Also shown in FIGS. 3-7, the coupling element 360 can further include a cable slot 410 sized to accommodate at least one cable extending into the spine 80 of the earcup 20. For example, as illustrated in FIGS. 2-4, the spine 80 can include an opening 420 through which one or more cables can pass (e.g., for connecting various components in the headphone system 10), and the coupling element 360 can include the cable slot 410 for accommodating that cable. In various implementations, the cable slot 410 spans a portion of the arcuate coupler 380, and in particular cases, spans at least half of the arc length of the arcuate coupler 380. In more particular cases, the cable slot 410 spans greater than two/thirds to three/quarters of the arc length of the arcuate coupler 380. In various implementations, the length of the cable slot 410 permits the cable to move without substantial restriction while the earcup 20 is rotated about the headband spring 50. That is, the cable slot 410 is aligned to permit rotation of the earcup 20 without substantially interfering with cable connection(s), e.g., to the PCB 170 (FIG. 4).

Figure 8:
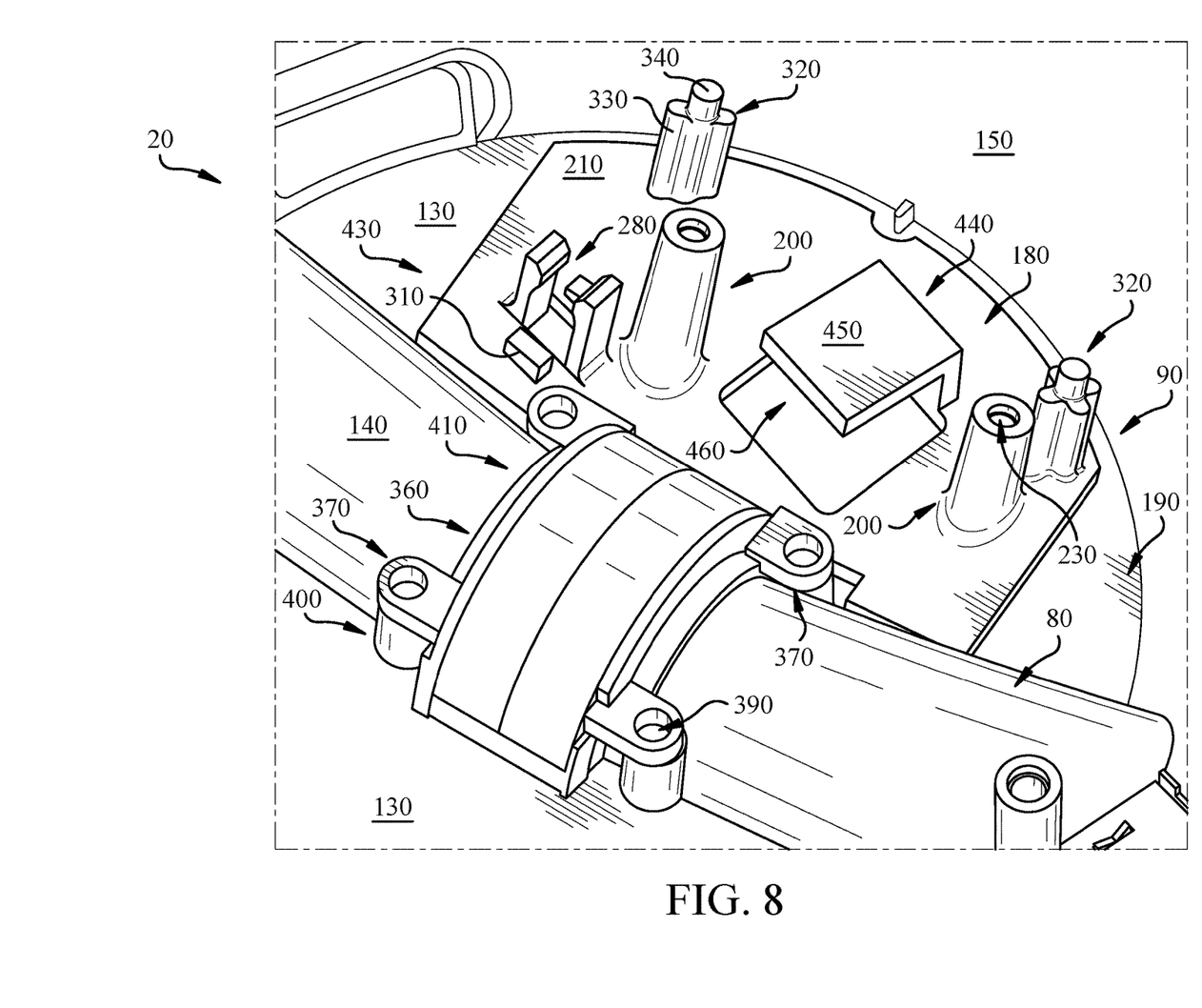
FIG. 8 shows a perspective view of a PCB mount on the inner portion of an earcup according to various additional implementations.
Figure 9:
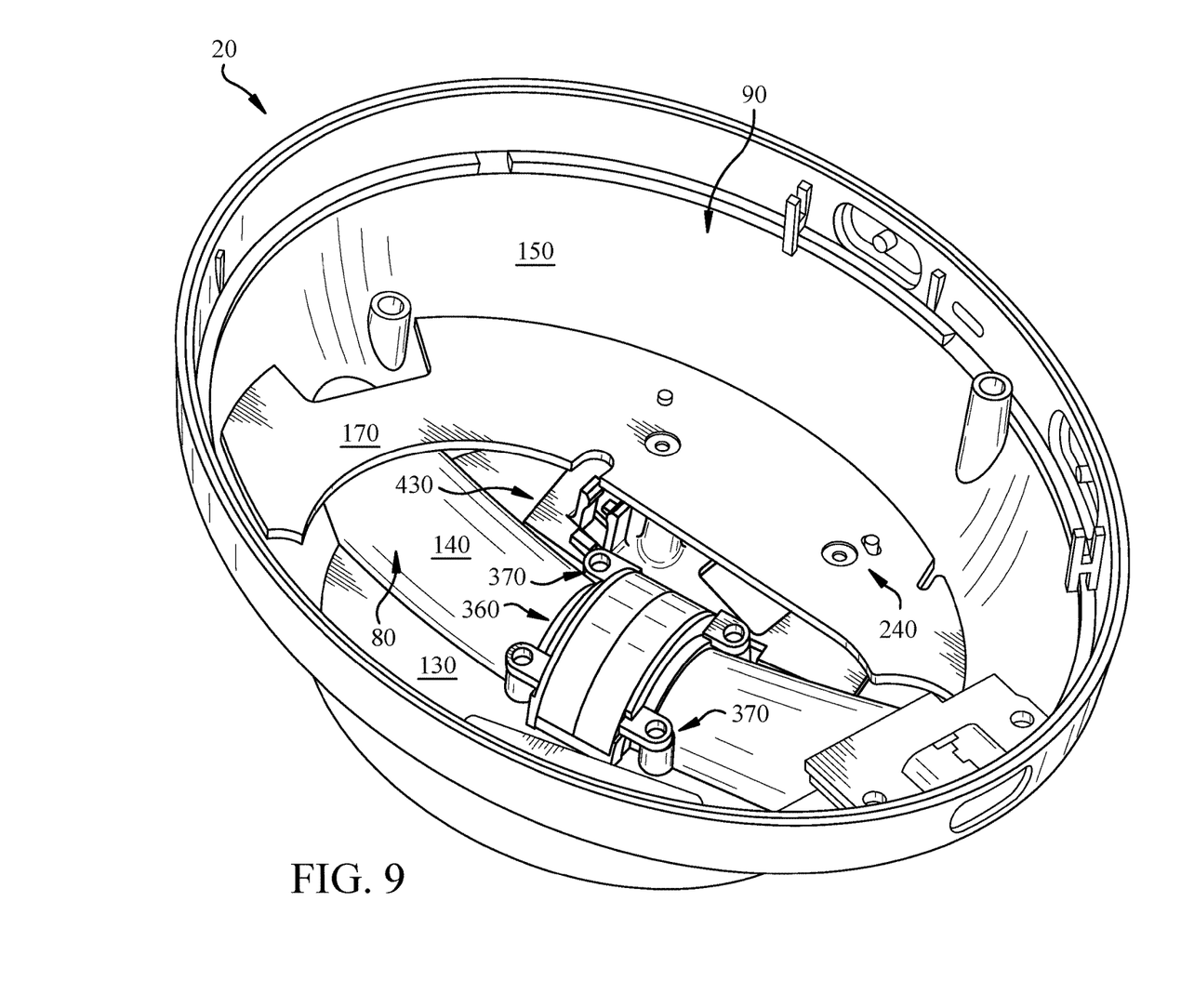
FIG. 9 shows a PCB mounted to the PCB mount of FIG. 8.

FIG. 8 illustrates an additional implementation of a mount 430 for a PCB 170 (FIG. 9), which further includes a cable guide 440 having an overhang 450 for preventing contact between at least one cable and the PCB 170. Mount 430 can include several features shown and described with reference to mount 160 (FIGS. 3-7), but in these additional implementations, mount 430 further includes the cable guide 440 that is configured to guide one or more cables away from contacting the overlying PCB 170 (FIG. 9). In some of these implementations, the overhang 450 includes a surface that is substantially perpendicular with the first surface 210 of the plate 180, and can be configured to face the PCB 170 (FIG. 9). In some cases, the overhang 450 can define a cable slot 460 between the first surface 210 and the overhang 450, which is sized to accommodate at least one cable and prevent contact of the cable(s) with the PCB 170 (FIG. 9).

As described herein, one or more portions of the mount 160 (and/or mount 430) can be formed in an integral process (e.g., via casting, stamping, forging and/or three-dimensional manufacturing), or can be formed separately and subsequently joined together (e.g., via welding, brazing and/or mechanical linking). In various implementations mount 160 and/or mount 430 can allow a PCB (e.g., PCB 170) to be secured within an earcup 20 and spaced from a capacitive touch surface 130 in order to reduce electrical interference between these elements.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. A headphone system comprising:
    an earcup comprising:
        an outer portion including a capacitive touch interface; and
        an inner portion opposing the outer portion and including a capacitive touch surface corresponding with the capacitive touch interface;
    a mount coupled to the earcup, the mount comprising:

a plate contacting at least a portion of the capacitive touch surface, the plate including at least one printed circuit board (PCB) mount; and a coupling element extending from the plate and including at least one coupler engaging the inner portion of the earcup; and a PCB coupled with the at least one PCB mount and electrically connected with the capacitive touch surface, wherein the at least one PCB mount extends away from the capacitive touch interface to physically separate the PCB from the capacitive touch surface.

2. The headphone system of claim 1, wherein the inner portion of the earcup comprises a spine extending therethrough, and wherein the coupling element is sized to matingly engage the spine.

3. The headphone system of claim 2, wherein the spine comprises an arcuate surface along the inner portion of the earcup, and wherein the coupling element comprises an arcuate coupler sized to matingly engage the spine.

4. The headphone system of claim 2, wherein the coupling element comprises a cable slot sized to accommodate at least one cable extending into the spine of the earcup.

5. The headphone system of claim 2, further comprising a continuous headband spring at least partially received by the spine of the earcup.

6. The headphone system of claim 1, wherein the plate comprises:

a first surface from which the at least one PCB mount extends; and a second surface opposing the first surface, the second surface having a substantially planar interface contacting the capacitive touch surface.

7. The headphone system of claim 6, wherein the plate further comprises a retention feature extending from the first surface of the plate.

8. The headphone system of claim 1, wherein the at least one PCB mount comprises at least one boss, and wherein the system further comprises a boss coupler joining the PCB and the PCB mount.

9. The headphone system of claim 1, wherein the plate further comprises at least one of:

a cable management feature sized to engage at least one cable extending from the PCB, at least one alignment pin for aligning the PCB relative to the plate, or a cable guide having an overhang for preventing contact between at least one cable and the PCB.

10. The headphone system of claim 1, further comprising:
an additional earcup; and
a headband connecting the earcup and the additional earcup.

11. The headphone system of claim 1, wherein the plate is located between the PCB and the capacitive touch surface.

12. A headphone system comprising:
an earcup comprising:
an outer portion including a capacitive touch interface; and
an inner portion opposing the outer portion and including a capacitive touch surface corresponding with the capacitive touch interface;
a mount coupled to the earcup, the mount comprising:

a plate directly contacting at least a portion of the capacitive touch surface, the plate including at least one printed circuit board (PCB) mount; and a coupling element extending from the plate and including at least one coupler engaging the inner portion of the earcup; and a PCB coupled with the at least one PCB mount and electrically connected with the capacitive touch surface.

13. The headphone system of claim 12, wherein the inner portion of the earcup comprises a spine extending therethrough, and wherein the coupling element is sized to matingly engage the spine.

14. The headphone system of claim 13, further comprising a continuous headband spring at least partially received by the spine of the earcup.

15. The headphone system of claim 14, further comprising:
an additional earcup; and
a headband connecting the earcup and the additional earcup, wherein the headband includes the continuous headband spring.

16. A headphone system comprising:
an earcup comprising:
an outer portion including a capacitive touch interface; and
an inner portion opposing the outer portion and including a capacitive touch surface corresponding with the capacitive touch interface,
wherein the inner portion of the earcup comprises a spine extending therethrough;
a mount coupled to the earcup, the mount comprising:
a plate contacting at least a portion of the capacitive touch surface, the plate including at least one printed circuit board (PCB) mount; and
a coupling element extending from the plate and including at least one coupler engaging the inner portion of the earcup,
wherein the coupling element is sized to matingly engage the spine;
a PCB coupled with the at least one PCB mount and electrically connected with the capacitive touch surface; and
a continuous headband spring at least partially received by the spine of the earcup.

17. The headphone system of claim 16, wherein the spine permits movement of the earcup along the continuous headband spring.

18. The headphone system of claim 17, wherein the earcup is movable along the continuous headband spring without modifying a length of the continuous headband spring.

19. The headband system of claim 16, wherein the spine extends at least partially through the earcup.

20. The headband system of claim 16, wherein the spine comprises an arcuate surface along the inner portion of the earcup, wherein the coupling element comprises an arcuate coupler sized to matingly engage the spine, and wherein the capacitive touch surface does not extend to the arcuate surface corresponding with the spine.

* * * * *